(12) United States Patent
Chan

(10) Patent No.: US 12,045,396 B1
(45) Date of Patent: Jul. 23, 2024

(54) FLOATED BUTTON AND VEHICLE SCREEN ASSEMBLY

(71) Applicants: Futaijing Precision Electronics (Yantai) Co., Ltd., Yantai (CN); HON HAI PRECISION INDUSTRY CO., LTD., New Taipei (TW)

(72) Inventor: Chao-Kai Chan, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/232,379

(22) Filed: Aug. 10, 2023

(30) Foreign Application Priority Data

Jul. 7, 2023 (CN) .......................... 202310834227.5

(51) Int. Cl.
 G06F 3/02 (2006.01)
 G06F 3/023 (2006.01)
 G06F 3/147 (2006.01)

(52) U.S. Cl.
 CPC ............ *G06F 3/0202* (2013.01); *G06F 3/023* (2013.01); *G06F 3/147* (2013.01)

(58) Field of Classification Search
 CPC ....................................... G06F 3/023
 See application file for complete search history.

(56) References Cited

U.S. PATENT DOCUMENTS

2014/0292695 A1* 10/2014 Wakamoto ............. B60K 35/10
 345/173

FOREIGN PATENT DOCUMENTS

| CN | 208836160 U | 5/2019 |
| CN | 215621411 U | 1/2022 |
| CN | 114633790 A | 6/2022 |

OTHER PUBLICATIONS

Machine translation CN 215621411 U Jan. 25, 2022 pp. 1-9; translation date (Year: 2024).*

* cited by examiner

*Primary Examiner* — Gustavo Polo
(74) *Attorney, Agent, or Firm* — ScienBiziP, P.C.

(57) ABSTRACT

A floated button and a vehicle screen assembly are provided. The vehicle screen assembly includes a display and the floated button. The floated button includes an adapter board electrically connect to a controller and a power source of the vehicle screen assembly through signal cables; a fixed base includes a receiving space, the adapter board is received in the receiving space, and the fixed base is connected to a rotation motor holder of the vehicle screen assembly; a button supporter arranged on the fixed base; and a button module arranged on the button supporter and floated on a side of the display. The button module includes a plurality of buttons arranged along a broadside extending direction. The buttons are electrically connected to the adapter board, and each of the buttons is configured to transmit corresponding button data to the controller through the adapter board when the button is triggered.

18 Claims, 4 Drawing Sheets

US 12,045,396 B1

FLOATED BUTTON AND VEHICLE SCREEN ASSEMBLY

CROSS-REFERENCE TO RELATED APPLICATION(S)

This application claims the benefit of and priority to Chinese Patent Application Serial No. 202310834227.5, filed on Jul. 7, 2023, at China's National Intellectual Property Administration, the contents of which are hereby incorporated herein fully by reference.

FIELD

The subject matter herein generally relates to vehicle terminal technologies, and particularly to a floated button and a vehicle screen assembly.

BACKGROUND

Traditional vehicle display screens (may also be referred to as screens hereinafter) are generally displays, which require the drivers' visual attention and direct interaction with the display screens (e.g., by touching the screens) to complete human-vehicle interaction operations. That is, due to the large size of the vehicle screen assembly, a driver needs to visually locate the function buttons on the screen, and then touch (e.g., by a finger) one of the buttons on the screen to execute the desired function. The driver needs a certain amount of time to observe the content on the screen, and most of the human-vehicle interaction is carried out while the driver is driving the vehicle. When the driver's attention is focused on the vehicle screen assembly and the driver is distracted from driving, it may cause a great safety hazard which may result in car accidents.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, the reference numerals designate corresponding parts throughout the several views.

DETAILED DESCRIPTION

Figure 1:
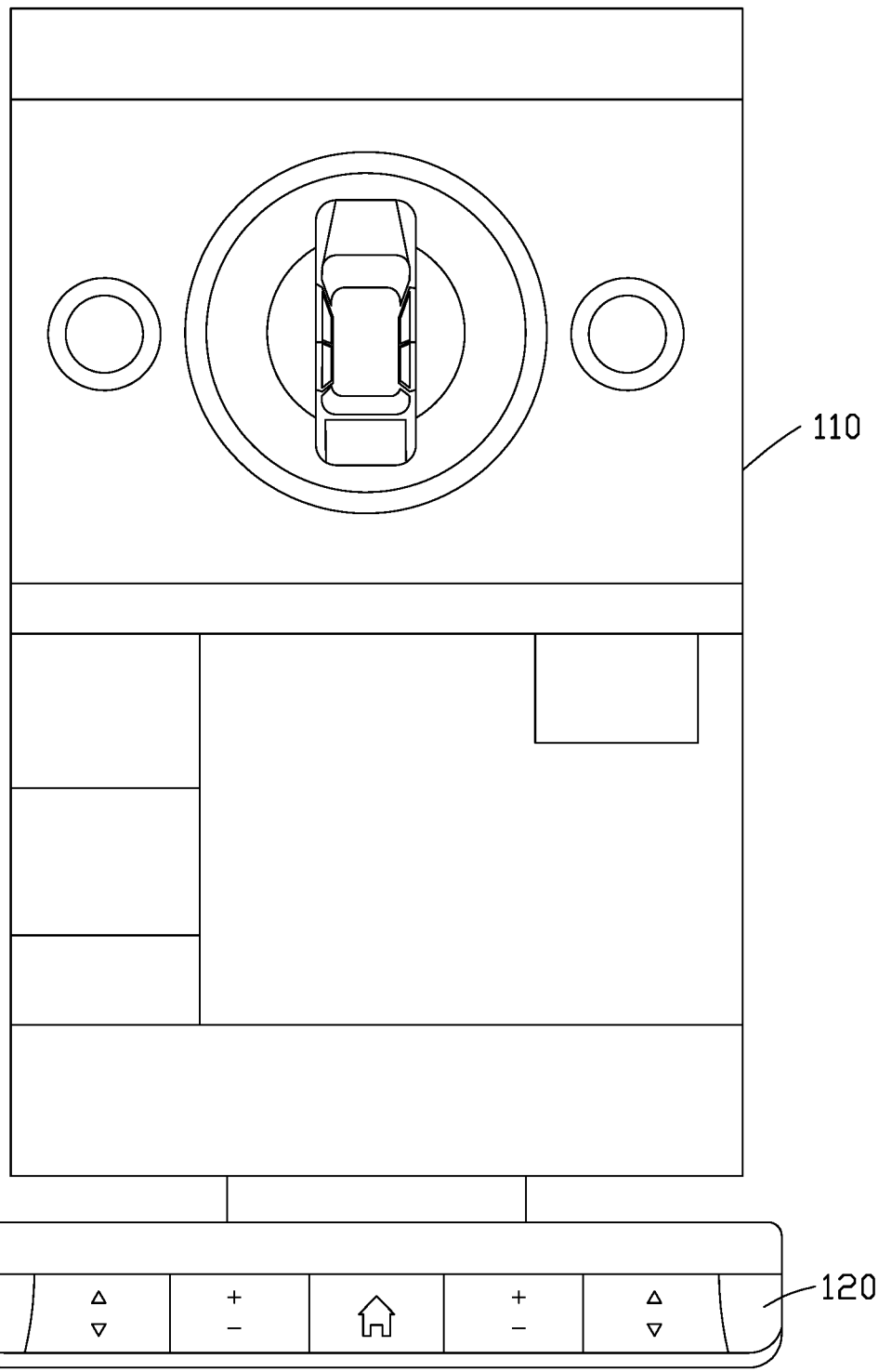
FIG. 1 is a schematic diagram illustrating a vehicle screen assembly, according to an example embodiment of the present application.

Implementations of the disclosure will now be described, by way of embodiments only, with reference to the drawings. The disclosure is illustrative only, and changes may be made in the detail within the principles of the present disclosure. It may, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

Presently, automobiles on the market are equipped with a central control panel for touch display, which has become a mainstream as a terminal for human-vehicle interactions. In the central control panel (or the vehicle screen assembly), the entire touch display interface may be divided into different areas, such as a function selection area, an information display area, and a vehicle control area, during the human-vehicle interaction. The driver mainly performs touching operations on the screen by, for example, pressing and/or sliding on the screen with his finger.

Traditional vehicle screens are generally displays, which require the drivers' visual and physical interactions with the screens to complete human-vehicle interaction operations. That is, due to the large size of the vehicle screen assembly, a driver needs to visually locate the function buttons on the screen, and then touch (e.g., by fingers) one of the buttons on the screen to execute the desired function. The driver needs a certain amount of time to observe the content on the screen, and most of the human-vehicle interaction is carried out while the driver is driving the vehicle. When the driver's attention is focused on the vehicle screen assembly and the driver is distracted from driving, it may cause a great safety hazard which may result in car accidents.

A floated button and a vehicle screen assembly, as provided in the present application, may substantially reduce the amount of time during which a driver is required to observe the screen content and interact with the screen. As a result, the driver may very quickly interact with the screen and complete a transaction using the floated button, which may substantially reduce the safety hazards while driving the vehicle.

FIG. 1 is a schematic diagram illustrating a vehicle screen assembly, according to an example embodiment of the present application. The vehicle screen assembly 100 includes a display 110 and a floated button 120.

In at least one embodiment, the display 110 may be connected to a control platform of the vehicle through a rotation motor and a rotation motor holder, which is secured on the control platform of the vehicle. In some embodiments, the rotation motor may be secured on the rotation motor holder through a shaft of the rotation motor connecting to a backboard of the display 110. By rotating the rotation motor, the display 110 may be controlled to switch between a landscape display and a portrait display. In some embodiments, the display 110 may be a touch panel for providing man-machine interaction through displaying an interface. The control platform may be a control center of the vehicle arranged in positions next to the driver's seat.

The floated button 120 may be connected to the rotation motor holder to be floatingly arranged to a side of the display 110. For example, the floated button 120 may be floatingly arranged to a side below the display 110, or floatingly arranged to a left side of the display 110. The arrangements of the floated button, however, are not limited to the examples presented in the present application.

In at least one embodiment, when the display 110 is switched between a landscape display and a portrait display, a position of the floated button 120 may stay unchanged. For example, when the display 110 is switched to the landscape display, the floated button 120 may be positioned below the display 110, or when the display 110 is switched to the portrait display, the floated button 120 may still remain below the display 110. Since the position of the floated button 120 stays unchanged, it will become very easy for the driver memorize the positions of the operation buttons after operating the floated button for a while, which may substantially help the driver to operate the floated button 120 based on the memory and without being required to look at the floated button while driving the vehicle.

Figure 2:
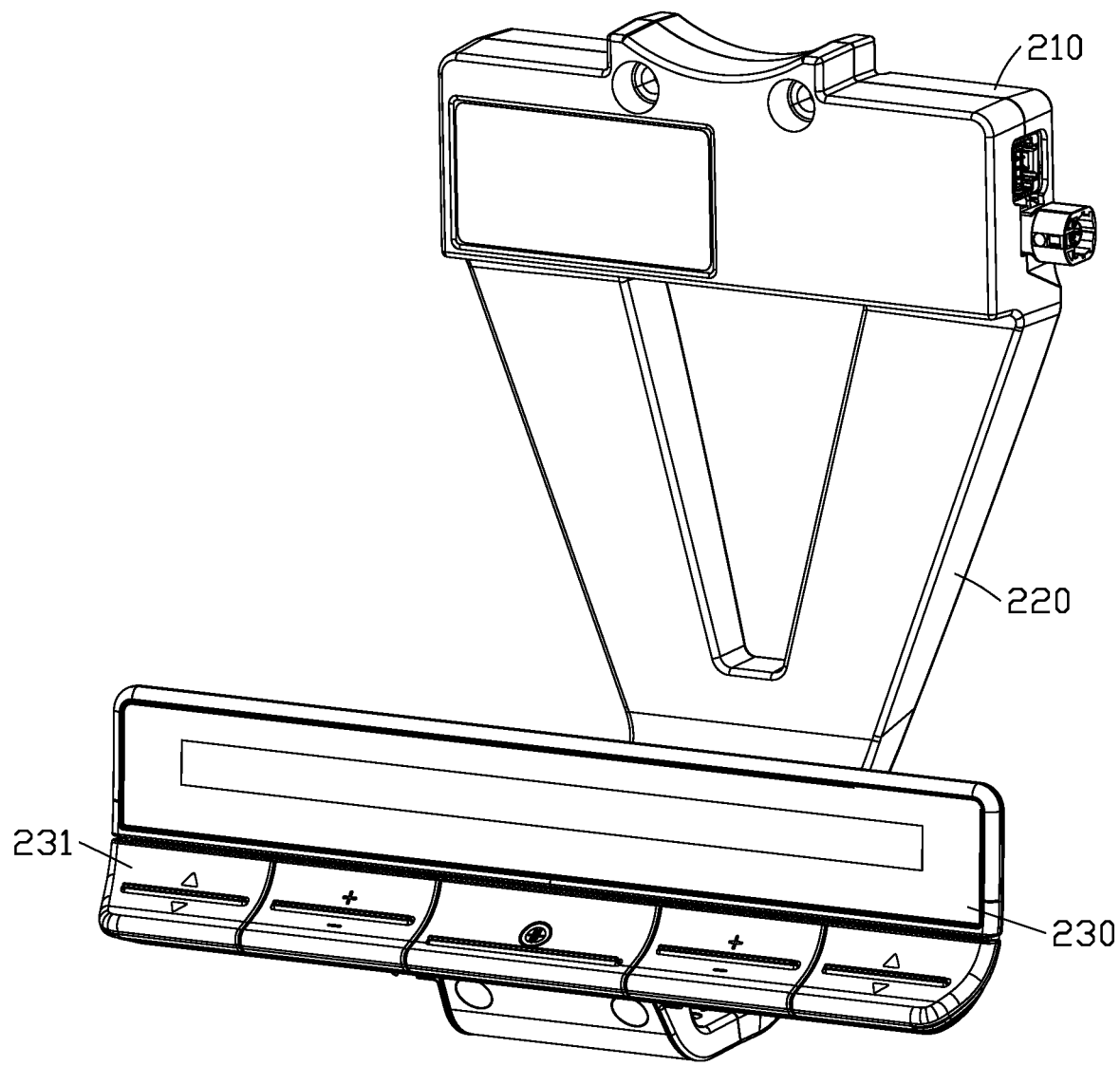
FIG. 2 is a schematic diagram illustrating a floated button, according to an example embodiment of the present application.

FIG. 2 is a schematic diagram illustrating a floated button, according to an example embodiment of the present application. The floated button 200 includes an adapter board (not shown), a fixed base 210, a button supporter 220, and a button module 230.

In at least one embodiment, the adapter board is configured to electrically connect to a controller and a power source of the vehicle screen assembly, for example, through signal cables. The fixed base 210 defines a receiving space in which the adapter board is received. The fixed base 210 may be connected to the rotation motor holder of the vehicle screen assembly 100. The button supporter 220 may be arranged on the fixed base 210. The button module 230 may be arranged on the button supporter 220 and may be floated on a side of the vehicle screen assembly. The button module 230 includes several buttons 231 arranged along a broadside extending direction. The buttons 231 are electrically connected to the adapter board. Each of the buttons 231 may be configured to transmit corresponding button data to the controller through the adapter board when being triggered (e.g., when the button is touched or pressed by a finger).

The adapter board may receive control signals transmitted from the controller of the vehicle screen assembly, and forward the received control signals to the button module 230. The adapter board may also receive the button data from the button module 230, and transmit the received button data to the controller of the vehicle screen assembly for the controller to execute the corresponding control instructions according to the received button data. In addition, the adapter board may be connected to the power source of the vehicle screen assembly for receiving the power voltage supplied by the power source. The adapter board may convert the power voltage to a power supply voltage applied for the button module 230. The adapter board transmits the power supply voltage to the button module 230 for powering the button module 230.

In at least one embodiment, the fixed base 210, in addition to including the receiving space for receiving the adapter board, may include one or more holes in the receiving space, through which the signal cables of the adapter board may be connected to the display. In addition, the fixed base 210 may be connected to the rotation motor holder through a connecting piece, so as to be secured on the rotation motor holder. For instance, one or more screw holes may be included in the corresponding positions of both the fixed base 210 and the rotation motor holder. Using the connecting piece, the fixed base 210 may be connected to the rotation motor holder through the screws engaging with the screw holes.

The safety hazards related to the distraction of a driver while driving a vehicle may be significantly reduced when the driver interacts with the floated button 200. That is, through arranging the fixed base 210 of the present embodiment to be connected to the rotation motor holder of the display, arranging the button supporter 220 to be connected to the fixed base 210, arranging the button module 230 to be connected to the button supporter 220 (e.g., such that the button module 230 may be floated to a side of the display and received in the receiving space of the fixed base 210 by being arranged on the adapter board), and by using the adapter board to transmit button data to the controller of the vehicle screen assembly, when a driver needs to interact with the vehicle screen assembly, the driver may simply use the buttons 231 of the button module 230, and as such, the time that the driver needs to observe the screen content and to interact with the screen may be significantly reduced.

Figure 3:
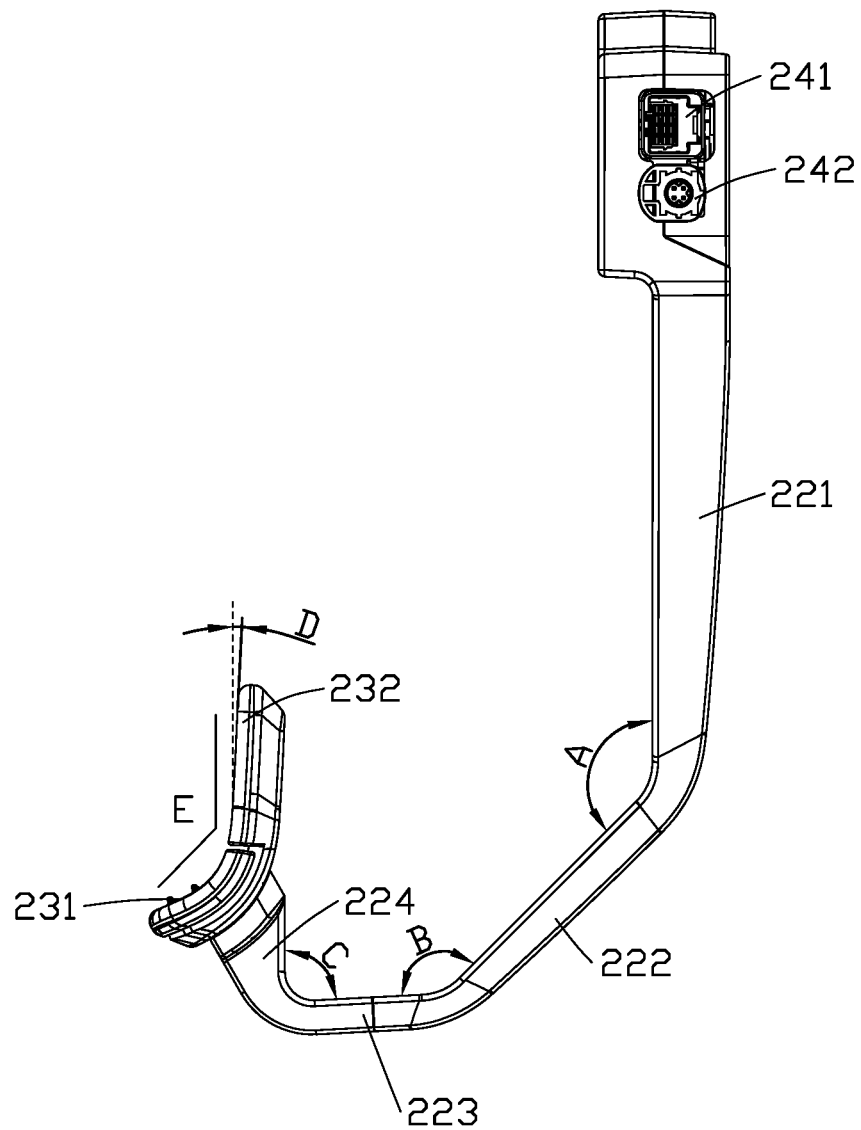
FIG. 3 illustrates a side view of the floated button, according to an example embodiment of the present application.

FIG. 3 illustrates a side view of the floated button, according to an example embodiment of the present application. The button supporter 220 includes a first support arm 221, a second support arm 222, a third support arm 223, and a fourth support arm 224 connected to each other in that order. The first support arm 221 may be connected to a side of the fixed base 210. An extended direction of the first support arm 221 may be substantially perpendicular to the side of the fixed base 210. The fourth support arm 224 may be connected to the button module 230. A first angle A may be formed between the first support arm 221 and the second support arm 222, a second angle B may be formed between the second support arm 222 and the third support arm 223, and a third angle C may be formed between the third support arm 223 and the fourth support arm 224. Each of the first angle A, the second angle B, and the third angle C may be greater than or equal to 90 degrees and less than 180 degrees. The lengths of the first support arm 221, the second support arm 222, the third support arm 223, and the fourth support arm 224 may be increased in that order, such that the first support arm 221, the second support arm 222, the third support arm 223, and the fourth support arm 224 may form a J-shaped rack for the button supporter 220. Through the button supporter 220, which is formed by the first support arm 221, the second support arm 222, the third support arm 223, and the fourth support arm 224, and after the fixed base 210 is connected to the rotation motor holder of the display, the J-shaped button supporter 220 may extend from a back of the display to a side of (e.g., below and in front of) the display. This way, the button module 230 may be floated on a side of (e.g., below) the display.

In at least one embodiment, the button supporter 220 may also be formed as the J-shaped rack with a rounding transition (e.g., instead of having fixed angles). In some other embodiments, the shape of the button supporter 220 may be different than the shapes that are described herein (e.g., a J-shaped rack) and the shape of the button supporter 220 may not be limited to what is shown and described herein.

The button supporter 220 can further include a wiring space connected to the receiving space, where the signal cables connecting the buttons 231 and the adapter board may be arranged in the wiring space.

Figure 4:
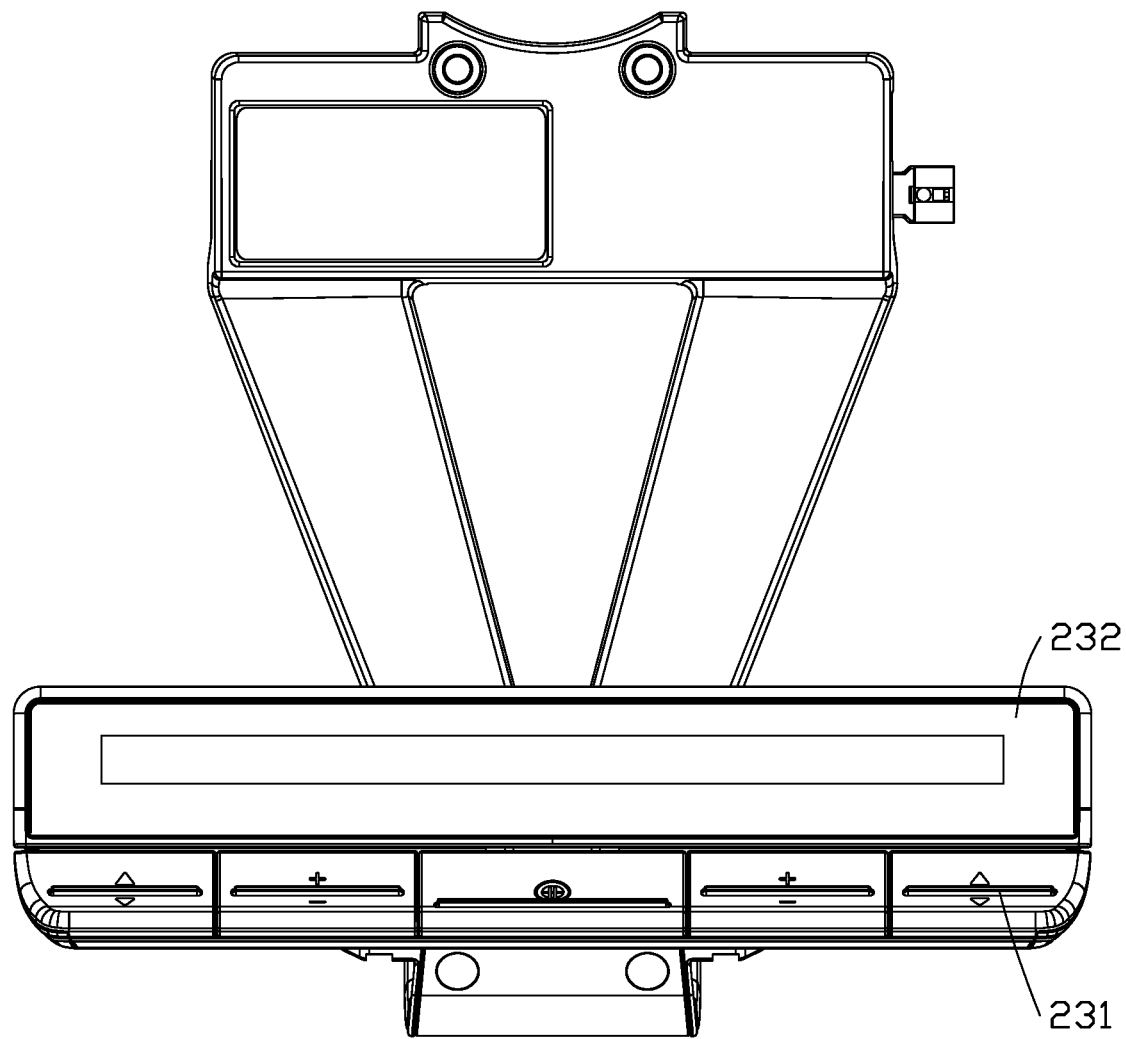
FIG. 4 illustrates a front view of the floated button, according to an example embodiment of the present application.

FIG. 4 illustrates a front view of the floated button, according to an example embodiment of the present application. The button module 230 includes the buttons 231. An arranging direction of the buttons 231 may be in accordance with an extend direction of a neighboring broadside of the display, such that to conveniently show the buttons 231 and the contents of the buttons 231 in positions corresponding to the display.

In at least one embodiment, the buttons 231 may be set according to the most frequently-used function buttons of the button module 230. For example, the buttons 231 may include left-side temperature controlling buttons (e.g., including increasing and decreasing buttons), fan controlling buttons (e.g., including increasing and decreasing buttons), a home button (e.g., a button that returns the control back to the main interface), volume controlling buttons (e.g., including increasing and decreasing buttons), and right-side temperature controlling buttons (e.g., including increasing and decreasing buttons). In some other embodiments, the number, description, and positioning of the buttons may be different than the ones described above and the number, description, and positioning of the buttons may not be limited to what is shown and described herein.

In at least one embodiment, the adapter board may include one or more interfaces of predetermined types. The adapter board may receive (e.g., in the receiving space of the fixed base 210) the interfaces of predetermined types may be arranged outside of the fixed base 210 (e.g., through the holes included in the fixed base 210), such that the adapter board may be connected to the external signal cables using corresponding connector plugs through the interfaces. The display may also include the interfaces of predetermined types, such that the adapter board with the interfaces of predetermined types may be electrically connected to the display, for example, through the signal cables using corresponding connector plugs.

In at least one embodiment, the button module 230 further includes a liquid crystal display (LCD) 232 arranged on a side of (e.g., above) the buttons 231. The LCD 232 may be electrically connected to the adapter board. The LCD 232 may be configured to display the function patterns of the buttons 231, for example, in positions that correspond to the buttons 231. The LCD 232 may be arranged above the buttons 231 and may display, e.g., after receiving the required power supplied by the adapter board, the function patterns of the buttons 231 in positions corresponding to the buttons 231. This way, the LCD 232 may indicate to the driver the functions for each button 231.

In at least one embodiment, the LCD 232 and the display may face the same direction. In some embodiments, an angle D may be formed between the LCD 232 and a perpendicular space. The angle D may be an acute angle, which may cause the LCD 232 to be upwardly slant, such that the driver may easily observe the content displayed on the LCD 232. As such, the time that the driver may need to observe the vehicle screen assembly may be substantially reduced, thereby reducing the safety hazards while the driver is driving.

The LCD 232 may be further configured to receive trigger information of the buttons 231 transmitted by the controller and to display the trigger information. For instance, after the driver operates a fan increasing button 231 (e.g., by pressing the button) to increase an air flow, the controller may generate information related to this adjustment and may transmit the air adjustment information to the LCD 232, where the LCD 232 may then display a predetermined text or pattern corresponding to the air adjustment information.

In at least one embodiment, as shown in FIG. 3, an angle E may be formed between the LCD 232 and a plane of the buttons 231. The angle E may be greater than or equal to 90 degrees and less than 180 degrees. When the LCD 232 and the display are facing the same direction, the plane of the buttons 231 may face upwardly slant, such that the driver may easily observe and operate the buttons 231, which may reduce the entire time that the driver is required to observe the vehicle screen assembly, thereby reducing the safety hazards while the driver is driving.

In at least one embodiment, the adapter board received in the receiving space of the fixed base 210 may include a Controller Area Network Bus (CAN Bus) interface 241 (as shown in FIG. 3) and a data converting unit. As shown in FIG. 3, the fixed base 210 may include a hole on a side for connecting to the receiving space. An outline of the hole may be compatible with an outline of the CAN Bus interface 241, such that the CAN Bus interface 241 may be inserted through the hole from the receiving space.

The data converting unit may be connected to the buttons 231 and may be configured to receive analog signals generated by the buttons when one or more of the buttons is triggered (e.g., pressed or touched), and may convert the analog signals into the button data of a CAN Bus data type. The CAN Bus interface 241 may be electrically connected to the controller and the power source through the CAN Bus. The CAN Bus interface 241 may further be configured to transmit the button data to the controller.

The adapter board received in the receiving space of the fixed base 210 may further include a Low-Voltage Differential Signaling (LVDS) interface 242 (as shown in FIG. 3) and a solution sequence unit. Similarly, the fixed base 210 may include another hole on the side for connecting to the receiving space. An outline of the other hole may be compatible with an outline of the LVDS interface 242, such that the LVDS interface 242 may be inserted through the other hole from the receiving space.

The LVDS interface 242 may be electrically connected to the controller through twisted-pair cables and may be configured to receive image signals transmitted by the controller. The solution sequence unit may be configured to process the image signals with a solution sequence, and may transmit the processed image signals to the LCD 232, such that the LCD 232 may display the function patterns of the buttons 231 in positions corresponding to the buttons 231.

In at least one embodiment, the CAN Bus interface 241 and the data converting unit may cooperatively form a first adapter board, and the LVDS interface 242 and the solution sequence unit may cooperatively form a second adapter board. The receiving space of the fixed base 210 may receive the first adapter board and the second adapter board at the same time.

A vehicle screen assembly is provided in the present application, including the floated button according to the embodiments of the present application. Beneficial effects of the vehicle screen assembly may be referred to as beneficial effects of the floated button, as described above, and not repeated herein.

While the present disclosure has been described with reference to particular embodiments, the description is illustrative of the disclosure and is not to be construed as limiting the disclosure. Therefore, those of ordinary skill in the art may make various modifications to the embodiments without departing from the scope of the disclosure, as defined in the appended claims.

What is claimed is:
1. A floated button applied in a vehicle screen assembly, the vehicle screen assembly comprising a display, the floated button comprising:
  an adapter board configured to electrically connect to a controller and a power source of the vehicle screen assembly through signal cables;

a fixed base comprising a receiving space, the adapter board received in the receiving space, the fixed base connected to a rotation motor holder of the display;

a button supporter arranged on the fixed base; and a button module arranged on the button supporter and floated on a side of the display, the button module comprising a plurality of buttons arranged along a broadside extending direction, the plurality of buttons electrically connected to the adapter board, each of the plurality of buttons configured to transmit corresponding button data to the controller through the adapter board when the button is triggered;

the button module further comprising a liquid crystal display (LCD), the LCD arranged on a side of the plurality of buttons, the LCD electrically connected to the adapter board, and the LCD configured to display function patterns of the plurality of buttons in positions corresponding to the plurality of buttons.

2. The floated button according to claim 1, wherein the LCD is further configured to receive trigger information associated with the plurality of buttons transmitted by the controller and to display the trigger information.

3. The floated button according to claim 1, wherein the LCD and the display are facing a same direction.

4. The floated button according to claim 1, wherein:
an angle is formed between the LCD and a plane of the plurality of buttons, and the angle is greater than 90 degrees and less than 180 degrees.

5. The floated button according to claim 1, wherein:
the adapter board comprises a Controller Area Network Bus (CAN Bus) interface and a data converting unit,
the data converting unit is connected to the plurality of buttons,
the data converting unit is configured to receive analog signals generated by the plurality of buttons when one or more of the plurality of buttons is triggered, and to convert the analog signals into the corresponding button data associated with a CAN Bus data type,
the CAN Bus interface is electrically connected to the controller and the power source through a CAN Bus, and
the CAN Bus interface is configured to transmit the corresponding button data to the controller.

6. The floated button according to claim 5, wherein:
the adapter board comprises a Low-Voltage Differential Signaling (LVDS) interface and a solution sequence unit,
the LVDS interface is electrically connected to the controller through twisted-pair cables,
the LVDS interface is configured to receive image signals transmitted by the controller,
the solution sequence unit is electrically connected to the LCD, and
the solution sequence unit is configured to process the image signals with a solution sequence, and transmit the processed image signals to the LCD, such that the LCD displays the function patterns of the plurality of buttons in positions corresponding to the plurality of buttons.

7. The floated button according to claim 6, further comprising more than one adapter boards, wherein:
the CAN Bus interface and the data converting unit cooperatively form a first adapter board,
the LVDS interface and the solution sequence unit cooperatively form a second adapter board, and
the receiving space receives the first adapter board and the second adapter board.

8. The floated button according to claim 1, wherein:
the button supporter further comprises a wiring space connected to the receiving space, and
the signal cables that connect the plurality of buttons to the adapter board are arranged in the wiring space.

9. The floated button according to claim 1, wherein the button supporter comprises a first support arm, a second support arm, a third support arm, and a fourth support arm connected in that order,
the first support arm is connected to a side of the fixed base, an extended direction of the first support arm is perpendicular to the side of the fixed base, the fourth support arm is connected to the button module,
a first included angle is formed between the first support arm and the second support arm, a second included angle is formed between the second support arm and the third support arm, a third included angle is formed between the third support arm and the fourth support arm, and
each of the first included angle, the second included angle, and the third included angle is greater than or equal to 90 degrees and less than 180 degrees.

10. A vehicle screen assembly comprising:
a display; and
a floated button floatingly arranged to a side below the display, the floated button comprising:
an adapter board configured to electrically connect to a controller and a power source of the vehicle screen assembly through signal cables;
a fixed base comprising a receiving space, the adapter board received in the receiving space, the fixed base connected to a rotation motor holder of the display;
a button supporter arranged on the fixed base; and
a button module arranged on the button supporter and floated on a side of the display, the button module comprising a plurality of buttons arranged along a broadside extending direction, the plurality of buttons electrically connected to the adapter board, each of the plurality of buttons configured to transmit corresponding button data to the controller through the adapter board when the button is triggered;
the button module further comprising a liquid crystal display (LCD), the LCD arranged on a side of the plurality of buttons, the LCD electrically connected to the adapter board, and the LCD configured to display function patterns of the plurality of buttons in positions corresponding to the plurality of buttons.

11. The vehicle screen assembly according to claim 10, wherein the LCD is further configured to receive trigger information associated with the plurality of buttons transmitted by the controller and to display the trigger information.

12. The vehicle screen assembly according to claim 10, wherein the LCD and the display are facing a same direction.

13. The vehicle screen assembly according to claim 10, wherein:
an angle is formed between the LCD and a plane of the plurality of buttons, and
the angle is greater than 90 degrees and less than 180 degrees.

14. The vehicle screen assembly according to claim 10, wherein:
the adapter board comprises a Controller Area Network Bus (CAN Bus) interface and a data converting unit,
the data converting unit is connected to the plurality of buttons, the data converting unit is configured to receive analog signals generated by the plurality of buttons when one or more of the plurality of buttons is triggered, and to convert the analog signals into the corresponding button data associated with a CAN Bus data type, and the CAN Bus interface is electrically connected to the controller and the power source through a CAN Bus, and the CAN Bus interface is configured to transmit the corresponding button data to the controller.

15. The vehicle screen assembly according to claim 14, wherein:

the adapter board comprises a Low-Voltage Differential Signaling (LVDS) interface and a solution sequence unit, the LVDS interface is electrically connected to the controller through twisted-pair cables, the LVDS interface is configured to receive image signals transmitted by the controller, and the solution sequence unit is electrically connected to the LCD, and the solution sequence unit is configured to process the image signals with a solution sequence, and transmit the processed image signals to the LCD, such that the LCD displays the function patterns of the plurality of buttons in positions corresponding to the plurality of buttons.

16. The vehicle screen assembly according to claim 15, wherein:

the floated button further comprises more than one adapter boards, the CAN Bus interface and the data converting unit cooperatively form a first adapter board, the LVDS interface and the solution sequence unit cooperatively form a second adapter board, and the receiving space receives the first adapter board and the second adapter board.

17. The vehicle screen assembly according to claim 10, wherein:

the button supporter further comprises a wiring space connected to the receiving space, and the signal cables that connect the plurality of buttons to the adapter board are arranged in the wiring space.

18. The vehicle screen assembly according to claim 10, wherein the button supporter comprises a first support arm, a second support arm, a third support arm, and a fourth support arm connected in that order, the first support arm is connected to a side of the fixed base, an extended direction of the first support arm is perpendicular to the side of the fixed base, the fourth support arm is connected to the button module, a first included angle is formed between the first support arm and the second support arm, a second included angle is formed between the second support arm and the third support arm, a third included angle is formed between the third support arm and the fourth support arm, and each of the first included angle, the second included angle, and the third included angle is greater than or equal to 90 degrees and less than 180 degrees.

* * * * *